June 16, 1953

R. W. JENSEN 2,641,985

COMBINATION PRESSURE RELIEF, VACUUM
RELIEF, AND DUMP VALVE

Filed Nov. 12, 1948

RAYMOND W. JENSEN,
INVENTOR.

BY John H. G. Wallace

June 16, 1953
R. W. JENSEN
2,641,985
COMBINATION PRESSURE RELIEF, VACUUM
RELIEF, AND DUMP VALVE
Filed Nov. 12, 1948
2 Sheets-Sheet 2
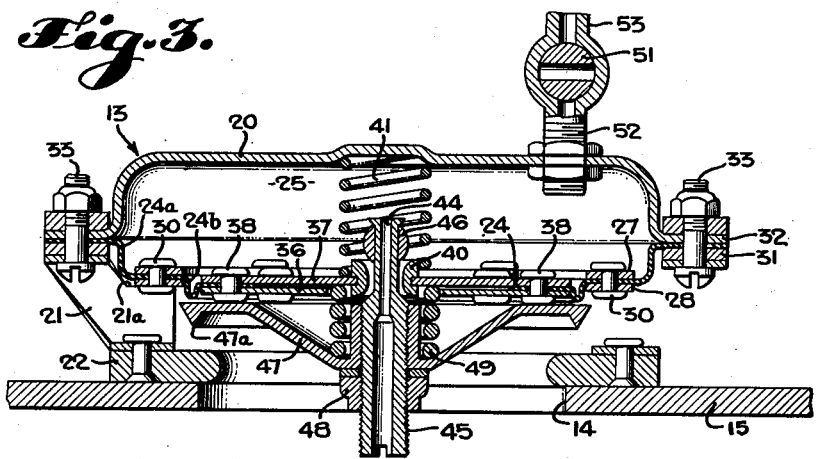
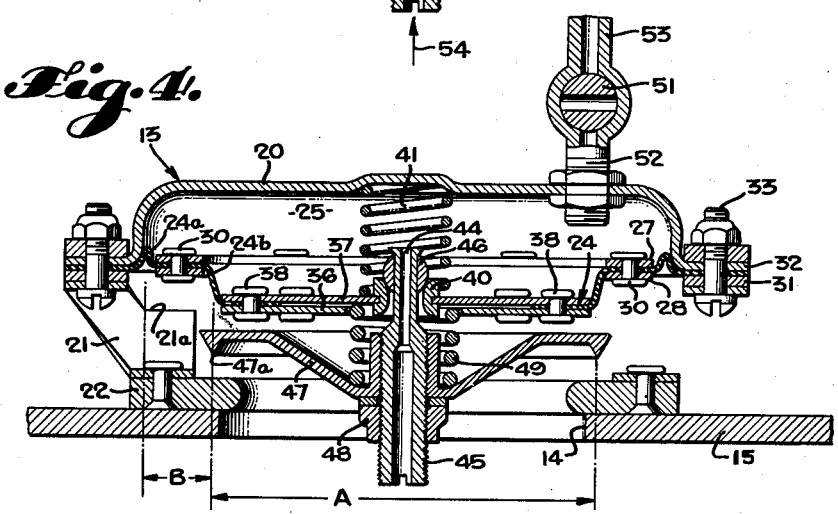
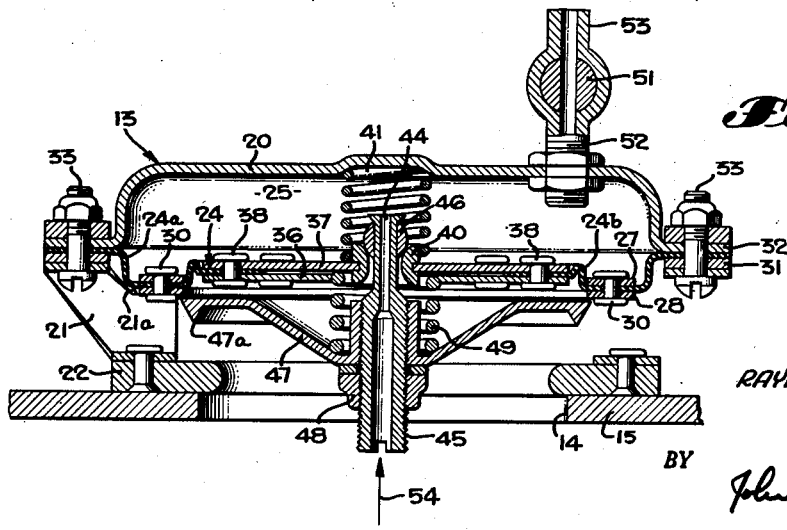
RAYMOND W. JENSEN,
INVENTOR.
BY John H. Wallace Patented June 16, 1953

2,641,985

UNITED STATES PATENT OFFICE 2,641,985

COMBINATION PRESSURE RELIEF, VACUUM RELIEF, AND DUMP VALVE

Raymond W. Jensen, Los Angeles, Calif., assignor to The Garrett Corporation, Los Angeles, Calif., a corporation of California Application November 12, 1948, Serial No. 59,465

20 Claims. (Cl. 98—1.5)

1

This invention relates in general to pneumatic valves, and particularly to such valves where used in conjunction with pressurized vehicular compartments. It has particular application to the cabins of high altitude aircraft for the control of air pressure therewithin.

In the pressurization of aircraft cabins for flight at altitudes above sea level it is customary to provide a blower or supercharger whereby air for ventilation purposes is taken from the ambient atmosphere, is compressed by the supercharger, and is then ducted to the cabin. In order to regulate the pressure of such ventilation air within the cabin, it is customary to provide an outflow valve or cabin pressure regulator which will maintain cabin pressure on a predetermined schedule. In addition to the regulator it is customary to install other valves which will provide egress of cabin air to atmosphere or ingress of atmospheric air to the cabin under certain conditions.

For example, if a malfunction occurs in the regulator at extreme altitude it is desirable that a positive pressure relief valve will vent excess cabin air to the atmosphere when the differential between cabin and atmospheric pressures approaches the safe structural limit of the cabin, in order that this safe differential will not be exceeded. Furthermore, a surge may occur in cabin pressure to which the regulator is incapable of immediate response even though operating satisfactorily otherwise. In such a case it is desirable for the auxiliary pressure relief valve to vent the cabin pressure surge air to atmosphere.

In another condition, if atmospheric pressure exceeds cabin pressure at any time, it is generally desirable to provide a valve which will allow ambient atmospheric air to enter the cabin and thus nullify the negative pressure or so-called "vacuum" differential. Such a condition might be encountered if the aircraft were to go into a steep dive and the regulator were incapable of reversed air flow. Heretofore, it has been usual to provide a separate valve of the check or "flapper" type to perform this function.

In still another condition, it is frequently desirable that equalization between cabin and atmospheric pressures be accomplished quickly. Such a condition might occur in a pressurized military aircraft entering a zone of combat, or when an aircraft of any type having its cabin pressurized is preparing to land. Heretofore, it has been customary to provide an accessory "dump" valve directly under the control of the pilot or flight engineer.

The pneumatic valve of the present invention accomplishes the three relief functions outlined above in a novel manner to be described. It is, therefore, an object to provide a pneumatic valve which combines in one structure the function of positive pressure relief, negative pressure relief, and manually selective dump.

Another object is to provide a valve of this type which is operable automatically in its pressure relief functions and wherein such automatic operation is accomplished by pneumatic means.

It is another object to provide a valve of this type which may be mounted on the outside of a pressurized enclosure such as an aircraft cabin wall or bulkhead.

It is a further object to provide such a valve as a unitary, compact item, simple in operation and maintenance and capable of being produced at lowered cost when compared with comparable items of the prior art which are each composed of several pieces of equipment.

Another object is to provide a relief valve which is operable pneumatically by the differentials of pressures existing across a movable wall of a closed chamber and existing across a flow valve member which provides communication between the space in an enclosure such as an aircraft cabin and the space outside the enclosure, i. e. the ambient atmosphere.

Another object of the invention contemplates a pilot valve and seat therefore disposed within the aforesaid closed chamber for effecting regulation of the pressure in the chamber within the positive pressure relief range of valve function. Still another object of the invention contemplates that an orifice, or other metering device, will provide restricted communication between the enclosure and the chamber for additionally controlling the pressure in the chamber.

It is another object to provide a novel construction for the pilot valve member and seat wherein they are self-aligning and the seat member is carried by a tubular member or stem which contains the restricted orifice. In the construction contemplated the pilot valve member is an annulus affixed coaxially in the movable wall of the closed chamber, there being a clearance space between the inner side of the annulus and the outer side of the orifice-containing stem which passes therethrough, providing a passageway for communication between the chamber and the space outside when the pilot valve member and seat are not in seating engagement.

It will be at once apparent to those skilled in the art that a device of this type has application to a variety of uses other than for installation in an aircraft. Hence, the following description is intended to show only a preferred embodiment of such a valve, and is not intended to limit the scope of the invention to such a use or structure.

Referring to the drawing, wherein like parts are indicated throughout by like reference numerals:

Figure 2:
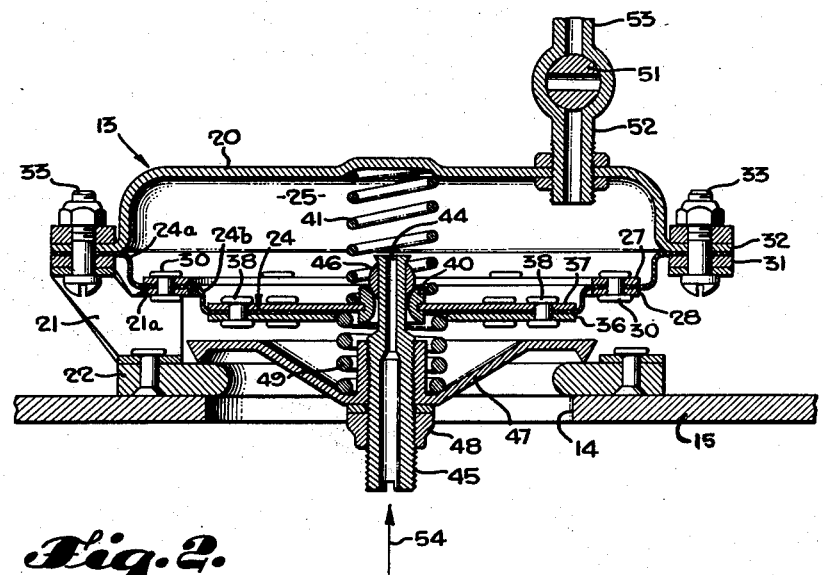
Fig. 2 is a cross-sectional view of the valve itself taken on the line 2—2 of Fig. 1.

Figs. 3, 4, and 5 are cross-sectional views similar to Fig. 2 and show the operation of the valve under various conditions.

Figure 1:
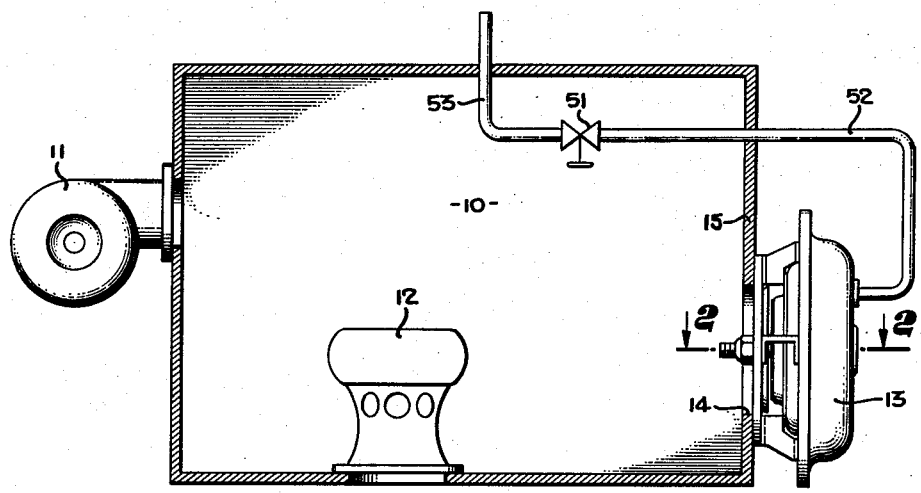
Fig. 1 is a diagrammatic showing of the relation of the various pressurizing components in an aircraft cabin.

Referring to Fig. 1, an enclosure 10, such as an aircraft cabin, is provided with a blower or supercharger 11 for furnishing a flow of compressed air thereto, and a pressure regulator 12 for regulating outflow of air and hence the pressure within the enclosure. A relief valve generally indicated by the numeral 13, and which is the subject of this invention, is shown as mounted on the outside of the enclosure over a port 14 in a wall 15 thereof.

Referring now to Fig. 2, a dished head 20 is supported by means of a plurality U-shaped struts 21 (only one of which is shown) in spaced relation to valve-seat ring 22 which is attached over the port 14 to the outside of the cabin wall or bulkhead 15 by bolts or other suitable means (not shown).

A diaphragm assembly, generally indicated at 24, constitutes a movable wall which defines one side of a chamber 25 which is the control chamber for the operation of the relief valve in its pressure relief, vacuum relief, and pneumatic dump functions. The assembly 24 comprises a single annular flexible diaphragm element which is divided into two portions 24a and 24b separated by a pair of rings 27 and 28 attached to the diaphragm by means of rivets 30. The outer periphery of the portion 24a is secured between a ring 31 and a flanged edge 32 of the head 20 by means of bolts 33, these bolts also serving to attach the head and diaphragm assembly to the struts 21. Movement of the rings 27 and 28 and of diaphragm portion 24a in a downwardly direction as viewed in Fig. 2, is precluded when the ring 28 comes to rest on the stop portions 21a of the struts 21 (best seen in Fig. 4).

The inner periphery of the diaphragm portion 24b is secured between two disc-like plates 36 and 37 by rivets 38, the plate 37 having affixed coaxially to its central portion a pilot valve member 40. A light compression spring 41 is shown as disposed between the head 20 and the plate 37 in order to urge the movable wall of the chamber outwardly.

Communication between the enclosure and the control chamber 25 is provided by a restricted bleed passage or orifice 44 in a stem 45. Affixed on the uppermost end of the stem 45 is a spherical pilot valve seat member 46 which is adapted to receive the member 40 in seating engagement. It is now seen that communication between the enclosure 10 and the chamber 25 is provided by the control orifice 44 and that communication between the chamber 25 and the space outside the enclosure 10 is controlled by the pilot valve members 40 and 46.

The lower end of the stem 45 outside of the chamber 25 has threaded thereon a flow valve member 47, having a knife-edge seating rim 47a adapted to seat on the ring 22, and a locknut 48. The area enclosed by the knife-edge rim 47a is substantially equal to the effective area of that part of the diaphragm assembly comprising diaphragm portion 24b, plates 36 and 37 and pilot valve member 40 for the purpose of achieving substantial balance of pressures acting on the valve member 47 and diaphragm assembly 24 in the normal range of pressures below which the relief valve is inoperative (as later described).

Between the valve member 47 and the plate 36 is a calibrated compression spring 49 which tends to urge the pilot valve members 40 and 46 into seating relationship. Adjustment of the force of spring 49 which tends to seat the pilot valve members is accomplished by the threaded relationship between stem 45 and valve member 47. Auxiliary means for controlling communication between the chamber 25 and the space outside is provided by a valve 51 and pipes 52 and 53. The pipe 52 may be of any convenient length in order that the valve 51 may be located either inside or outside the enclosure 10, as for example where the valve 51 may be under the direct manual control of the pilot in an aircraft cabin. In such a case, as shown in Fig. 1, the pipe 52 would extend through the wall 15 to a point adjacent the aircraft pilot where valve 51 would be installed, and pipe 53 would extend from the valve 51 to any point providing access to the atmosphere. Upon opening of valve 51 direct communication would then be established between the chamber 25 and the atmosphere.

It is now apparent that the position of flow member 47 with respect to ring 22 is governed by the position within the chamber 25 of portions of the diaphragm assembly 24, particularly of plate 36. The sole function of spring 41, whose lower end rests on plate 37, is to seat the member 47 on the ring 22, which is the normal relationship of these two parts. Thus if the valve 13 were to be mounted overhead in a vertical position, gravity alone would normally suffice to seat the member 47, and the spring 41 would be unnecessary.

*Operation—Positive pressure relief*

Positive pressure relief occurs when the pressure in the enclosure 10 exceeds the pressure outside the enclosure a calibrated amount by which the pilot valve 40 moves against the force of spring 49 to disengage the pilot valve seat member 46 and establish communication between the chamber 25 and the space outside the enclosure 10.

As an example, a valve of this type will be assumed to be installed in an aircraft whose pressure regulator is set for differential operation at 2.75 p. s. i. It is further assumed that the aircraft cabin will be unpressurized up to an altitude of 10,000 feet where the ambient atmospheric pressure is about 10.1 p. s. i. From these assumptions it is seen that the pressure regulator will enter into differential operation at 7.35 p. s. i. ambient atmospheric pressure which is at an altitude of approximately 18,000 feet. A further assumption is made that the relief valve is calibrated for positive pressure relief at 3.0 p. s. i. Suppose that the aircraft has flown to an altitude of 30,000 feet (ambient pressure 4.36 p. s. i.) in which case the regulator has established a virtual cabin altitude of about 18,800 feet, and at that time a malfunction of the regulator occurs so as to shut-off the outflow of ventilation air. Cabin pressure will then rise until the differential between cabin and atmosphere becomes 3 p. s. i. (a virtual cabin altitude of approximately 18,000 feet) at which point the relief valve will take over control of cabin pressure, Up to the point of regulator malfunction, i. e. normal flight schedule when the differential between cabin and atmospheric pressures is not greater than that for which the valve is calibrated to open, the pressure in the chamber 25 is equal to cabin pressure by virtue of the constant communication therebetween through the restricted passage 44. This 2.75 p. s. i. differential is sensed by the diaphragm assembly 24 which tends to move downwardly as viewed in Figs. 2 and 3, the ring 28 coming to rest against the stops 21a which thereby retard any further downwardly movement of the rings 27 and 28 and diaphragm portion 24a. However the diaphragm portion 24b and the plates 36 and 37 (with the pilot valve member 40) are still free to move downwardly against the force of spring 49.

As noted above, the effective area of the now movable part of the diaphragm assembly is substantially equal to that area encompassed by the knife-edge rim 47a of the valve number 47, hence the effect of cabin and ambient atmospheric pressures on the diaphragm assembly and on the valve member 47 is balanced, so that valve member 47 has to overcome only the relatively small force of spring 41 in order to unseat and permit outflow of cabin air.

When the differential between the pressures in chamber 25 (which is substantially that of cabin) and atmosphere, as sensed by the diaphragm portion 24b, plates 36 and 37, and valve number 40, exceeds the force equivalent to 3.0 p. s. i. for which the spring 49 is calibrated, the pilot valve member 40 is unseated from the seat member 46, as shown in Fig. 3, allowing chamber air to escape to atmosphere at a greater rate than it enters the chamber from the cabin through the restricted passage 44. Thus, with escape of chamber air to atmosphere at a rate greater than it enters from cabin, pressure in the chamber is lowered until the cabin pressure exerted against valve 47 is sufficient to overcome the combined force of spring 41 and the effective pressure in the chamber against the diaphragm, resulting in an upward movement of the whole coaxial system of valve 47, stem 45, spring 49, diaphragm bight portion 24b, plates 36 and 37, and pilot valve members 40 and 46 against the slight force of spring 41. When the differential between cabin pressure and atmosphere again drops below 3.0 p. s. i. the lowered pressure in chamber 25 allows spring 49 to again seat pilot valve member 40 on its seat 46, thereby preventing further escape of chamber air to atmosphere. Chamber air pressure and cabin pressure then equalize, whereupon the force of spring 41 moves the coaxial system downwardly until the knife-edge rim 47a of valve 47 engages the ring 22, with a resultant cessation of cabin air flow to atmosphere.

Operation—Negative pressure relief

Taking the same example as before, of a relief valve of this type installed in an aircraft, it will be shown now how this valve provides vacuum relief when the atmospheric pressure exceeds cabin pressure.

Referring to Figs. 2 and 4, it is seen that atmospheric pressure is sensed by the diaphragm assembly 24 and by the flow valve member 47. Ordinarily, the pressure in chamber 25 is greater than atmospheric, hence the ring 28 rests on the stops 21a. Therefore, when atmospheric pressure exceeds cabin pressure (and hence chamber pressure) the differential between these is applied to the diaphragm portions 24a and 24b and to the rings 28, thereby lifting the ring off the stops and exerting a tension on the diaphragm portion 24b which is transmitted through the coaxial assembly to the valve member 47. When this tension overcomes the slight force of spring 41 the coaxial assembly moves upwardly allowing ambient atmospheric air to enter and make cabin pressure equal to atmospheric pressure.

As noted above the valve membed 47 is balanced with respect to the differential between cabin and atmospheric pressures since the same differential exists over substantially the same effective area A of the diaphragm assembly. Hence, when the differential becomes negative that annular portion of the diaphragm assembly indicated at B (Fig. 4) is the only portion of the whole relief valve that is affected by the negative pressure differential. The annular portion B is not affected by positive pressure differentials when ring 28 rests on stops 21a, hence has no function to perform in that range of relief valve operation.

Dump valve operation

Pneumatic operation of the valve in its dump function is accomplished by the manual control applied to valve 51 in a manner now to be described. In normal flight the valve 51 is in its closed position as shown in Fig. 2. When the pilot wishes to equalize cabin and ambient atmospheric pressures he merely opens valve 51, which as previously stated is located conveniently near him, resulting in a rapid equalization of pressures in chamber 25 with that of the atmosphere. Equal pressures (atmospheric) now exist on both sides of the diaphragm assembly 24, and the differential between cabin and atmospheric pressures existing across valve member 47 forces it to move open and allow cabin air to discharge until cabin pressure is equal to atmospheric.

It will be apparent that the dumping function may also be accomplished mechanically by the application of a force to the stem 45 in the direction indicated by the arrow 54, this force being applied by any suitable electrical means such as a solenoid, or a positioning jack, or by purely manual means such as a lever and cam arrangement.

I claim:

1. A positive pressure relief, negative pressure relief, and dump valve for mounting externally of a pressurized enclosure and in communication with a port in a wall thereof, comprising: a flow valve member controlling communication through the port; a closed chamber disposed in spaced relation to the flow valve member; a movable wall forming one side of the closed chamber, the flow valve member being operatively connected to the movable wall; means dividing the movable wall into an inner portion and an outer portion; stop means for arresting movement of the outer portion of the movable wall outwardly from the closed chamber, the said stop means allowing inward movement of the outer portion of the movable wall into the closed chamber; means providing restricted communication between the space in the enclosure and the space in the closed chamber; pilot valve means operated by the inner portion of the movable wall for controlling communication between the closed chamber and a zone of lower pressure; spring means normally urging the pilot valve means to a closed position; conduit means leading from the closed chamber to a zone of lower pressure; and a shut-off valve in the conduit means.

2. A positive pressure relief, negative pressure relief, and dump valve for mounting externally of a pressurized enclosure and in communication with a port in a wall thereof, comprising: a flow valve member controlling communication through the port; a closed chamber disposed in spaced relation to the flow valve member; a movable wall forming one side of the closed chamber, the flow valve member being operatively connected to the movable wall; means dividing the movable wall into an inner portion and an outer portion; stop means for arresting movement of the outer portion of the movable wall outwardly from the closed chamber, the said stop means allowing inward movement of the outer portion of the movable wall into the closed chamber; means providing restricted communication between the space in the enclosure and the space in the closed chamber; pilot valve means operated by the movable wall for controlling communication between the closed chamber and a zone of lower pressure; and spring means normally urging the pilot valve means to a closed position.

3. A positive pressure relief valve for mounting externally of an enclosure and for providing eflux of air therefrom when the differential between the pressures internal and external thereof exceeds a predetermined amount, comprising: a flow valve member for controlling communication through a port in a wall of the enclosure; a closed chamber disposed in spaced relation to the flow valve member; a movable wall forming one side of the closed chamber, the flow valve member being operatively connected to the movable wall; means providing restricted communication between the space in the enclosure and the space in the closed chamber; pilot valve means operated by the movable wall for controlling communication between the closed chamber and a zone of lower pressure; and spring means normally urging the pilot valve means to a closed position.

4. A positive pressure relief valve for providing eflux of air from an enclosure when the differential between the pressures internal and external thereof exceeds a predetermined amount, comprising: a seat; a flow valve member over the seat; a closed chamber disposed in spaced relation to the flow valve member; a movable wall forming one side of the closed chamber; means for operatively connecting the flow valve member to the movable wall, said connecting means comprising a stem having passage means providing restricted communication between the space in the enclosure and the space in the closed chamber; pilot valve means operated by the movable wall for establishing communication between the space in the closed chamber and the space outside the enclosure; and spring means normally urging the pilot valve means to a closed position.

5. A positive pressure relief valve for providing eflux of air from an enclosure when the differential between the pressures internal and external thereof exceeds a predetermined amount, comprising: a seat; a flow valve member over the seat; a closed chamber disposed in spaced relation to the flow valve member; a movable wall forming one side of the closed chamber; a pilot valve member in the movable wall; a stem secured to the flow valve member and extending through a bore in the pilot valve member into the closed chamber; a pilot valve seat member secured on the stem within the closed chamber and adapted to receive the pilot valve member in sealing relationship to normally prevent communication between the space in the closed chamber and the space outside; a passage means in the stem providing restricted communication between the space in the enclosure and the space in the closed chamber; and spring means normally urging the pilot valve members to a closed position.

6. A positive pressure relief valve for providing eflux of air from an enclosure when the differential between the pressures internal and external thereof exceeds a predetermined amount, comprising: a seat; a flow valve member over the seat; a closed chamber disposed in spaced relation to the flow valve member; a movable wall forming one side of the closed chamber; a pilot valve member in the movable wall; a stem secured to the flow valve member and extending through a bore in the pilot valve member into the closed chamber; a pilot valve seat member secured on the stem within the closed chamber and adapted to receive the pilot valve member in sealing relationship to normally prevent communication between the space in the closed chamber and the space outside; passage means providing restricted communication between the space in the enclosure and the space in the closed chamber; and spring means normally urging the pilot valve members to a closed position.

7. A positive pressure relief and dump valve for providing eflux of air from an enclosure, comprising: a seat; a flow valve member over the seat; a closed chamber disposed in spaced relation to the flow valve member; a movable wall forming one side of the closed chamber, the flow valve member being operatively connected to the movable wall; passage means providing restricted communication between the space in the enclosure and the space in the closed chamber; pilot valve means operated by the movable wall for establishing communication between the space in the closed chamber and the space outside the enclosure; spring means normally urging the pilot valve means to a closed position; and means for providing communication between the closed chamber and a zone of lower pressure.

8. A positive pressure relief and dump valve for providing eflux of air from an enclosure, comprising: a seat; a flow valve member over the seat; a closed chamber disposed in spaced relation to the flow valve member; a movable wall forming one side of the closed chamber; a stem secured to the flow valve member and operatively connected to the movable wall in such manner that movement of the wall into the closed chamber causes the flow valve member to open; a restricted passage in the stem providing communication between the space in the enclosure and the space in the closed chamber; pilot valve means operated by the movable wall for establishing communication between the space in the closed chamber and the space outside the enclosure; spring means normally urging the pilot valve means to a closed position; and means for providing communication between the closed chamber and a zone of lower pressure.

9. A positive pressure relief and dump valve for providing eflux of air from an enclosure, comprising: a seat; a flow valve member over the seat; a closed chamber disposed in spaced relation to the flow valve member; a movable wall forming one side of the closed chamber; a pilot valve member in the movable wall; a stem secured to the flow valve member and extending through a bore in the pilot valve member into the closed chamber; a pilot valve seat member secured on the stem within the closed chamber and adapted to receive the pilot valve member in sealing relationship to normally prevent communication between the space in the closed chamber and the space outside; passage means providing restricted communication between the space in the enclosure and the space in the closed chamber; spring means normally urging the pilot valve members to a closed position; and means for providing communication between the closed chamber and a zone of lower pressure.

10. A positive pressure relief and dump valve for providing efflux of air from an enclosure, comprising: a flow valve member controlling communication through a port in a wall of the enclosure; a closed chamber disposed in spaced relation to the flow valve member; a movable wall forming one side of the closed chamber; a pilot valve member in the movable wall; a stem secured to the flow valve member and operatively connected to the movable wall in such manner that movement of the wall into the closed chamber causes the flow valve member to open; a restricted passage in the stem providing communication between the space in the enclosure and the space in the closed chamber; a pilot valve seat member secured on the stem within the closed chamber and adapted to receive the pilot valve member in sealing relationship to normally prevent communication between the space in the closed chamber and the space outside; spring means normally urging the pilot valve members to a closed position; and means for providing communication between the closed chamber and a zone of lower pressure.

11. A valve having a flow valve member for regulating pressure in a pressurized enclosure, comprising: a closed chamber having a movable wall; means for operatively associating the flow valve member with the movable wall; pilot valve means for controlling communication between the closed chamber and a zone of lower pressure, the pilot valve means being operatively engaged with and actuated by movement of the movable wall; and means providing communication between the pressurized enclosure and the closed chamber.

12. A valve having a flow valve member for regulating pressure in a pressurized enclosure, comprising: a closed chamber having a movable wall; means for operatively associating the flow valve member with the movable wall; means for providing communication between the closed chamber and a zone of higher pressure; means for providing communication between the closed chamber and a zone of lower pressure; and pilot valve means in one of said communication means, said pilot valve means being operatively engaged with and actuated by movement of the movable wall.

13. The invention of claim 12 further characterized in that the enclosure constitutes the zone of higher pressure.

14. The invention of claim 12 further characterized in that the atmosphere outside the enclosure constitutes the zone of lower pressure.

15. The invention of claim 12 further characterized in that the pilot valve means is in the communication means between the closed chamber and a zone of lower pressure.

16. The invention of claim 12 further characterized in that the pilot valve means comprises a seat and a seat member cooperating therewith, said seat and seat member being operatively associated with the movable wall and the flow valve member.

17. A valve having a flow valve member for regulating pressures in a pressurized enclosure, comprising: a closed chamber having first and second independently movable wall means; means for operatively associating the flow valve member with the first movable wall means; means for operatively associating the flow valve member with the second movable wall means whereby the second movable wall means moves the flow valve member when pressure external of the chamber exceeds pressure internal thereof; pilot valve means for controlling communication between the closed chamber and a zone of lower pressure, the pilot valve means being operatively engaged with and actuated by movement of one of the movable wall means; and passage means providing communication between a zone of higher pressure and the closed chamber.

18. In combination: a closed chamber having first and second wall means movable relative to each other and to said chamber and each subject to the differential of pressures internally and externally of the chamber; a flow valve member in spaced relation to said first wall means and subject on a first side to pressure externally of said chamber; means for connection of said flow valve member with said first movable wall means, said valve member and said first wall means having substantially equal effective pressure areas subject to the pressure externally of said chamber, whereby said first movable wall means and said flow valve member move relative to said second movable wall means when the pressure on the second side of said flow valve member exceeds the pressure internally of said chamber; and means for moving said first movable wall means and said flow valve member upon movement of said second movable wall means to actuate said flow valve member when the pressure externally of said chamber exceeds the pressure internally thereof.

19. The combination defined by claim 18 further characterized in that said last mentioned means comprises an interconnection between said first movable wall means and said second movable wall means for the transmission of valve moving forces from said second movable wall means.

20. The combination defined by claim 18 further characterized in having means restraining movement of said second wall means when the pressure internally of said chamber exceeds the pressure externally thereof.

RAYMOND W. JENSEN.

References Cited in the file of this patent

UNITED STATES PATENTS

| Number | Name | Date |
|---|---|---|
| 2,399,326 | Crot | Apr. 30, 1946 |
| 2,436,183 | Snedecor | Feb. 17, 1948 |
| 2,447,918 | Teague | Aug. 24, 1948 |
| 2,463,487 | Widgery et al. | Mar. 1, 1949 |
| 2,463,489 | Kemper | Mar. 1, 1949 |
| 2,463,492 | Arthur | Mar. 1, 1949 |
| 2,466,465 | Morris | Apr. 5, 1949 |
| 2,484,852 | Paget | Oct. 18, 1949 |
| 2,485,113 | Roth et al. | Oct. 18, 1949 |
| 2,498,633 | Arthur | Feb. 28, 1950 |